(12) United States Patent
Gillespie

(10) Patent No.: US 6,823,048 B2
(45) Date of Patent: Nov. 23, 2004

(54) CALLING NAME INFORMATION CACHING

(75) Inventor: Donald E. Gillespie, Boulder, CO (US)

(73) Assignee: Qwest Communications International Inc., Denver, CO (US)

(*) Notice: Subject to any disclaimer, the term of this patent is extended or adjusted under 35 U.S.C. 154(b) by 535 days.

(21) Appl. No.: 09/813,629

(22) Filed: Mar. 21, 2001

(65) Prior Publication Data

US 2002/0137497 A1 Sep. 26, 2002

(51) Int. Cl.[7] .............................................. H04M 1/64
(52) U.S. Cl. ............................ 379/88.19; 379/207.15; 379/207.02; 379/142.01; 455/414.1; 455/415
(58) Field of Search ........................... 455/414.1, 415; 379/88.19–88.21, 207.14, 207.15, 207.02, 201.01, 142.01, 142.06

(56) References Cited

U.S. PATENT DOCUMENTS

| | | | | |
|---|---|---|---|---|
| 5,465,290 A | * | 11/1995 | Hampton et al. | 379/88.02 |
| 6,463,270 B1 | * | 10/2002 | Chang et al. | 455/403 |
| 6,532,490 B1 | * | 3/2003 | Lewis et al. | 709/217 |
| 6,560,226 B1 | * | 5/2003 | Torrey et al. | 370/360 |

* cited by examiner

*Primary Examiner*—Fan Tsang
*Assistant Examiner*—Ovidio Escalante
(74) *Attorney, Agent, or Firm*—Brooks Kushman P.C.

(57) ABSTRACT

Calling name presentation services are provided by maintaining a local cache of requested information. When a called destination is determined to subscribe to calling name presentation, the local cache is queried to determine if the calling number is in the local cache. If the calling number is in the local cache, information corresponding to the calling number is retrieved from the local cache. If the calling number is not in the local cache, a remote database is queried for the information. The information retrieved from the remote database is stored in the local cache. In either case, the name information is sent to the call destination. A Signaling System 7 architecture may be used to implement local caching.

19 Claims, 3 Drawing Sheets

CALLING NAME INFORMATION CACHING

BACKGROUND OF THE INVENTION

1. Field of the Invention

The present invention relates to providing calling name information with incoming calls.

2. Background Art

Among the many services available to modern telecommunications systems users is the ability to receive information about a calling telecommunications device before the call is answered. Such services, which may be generally termed calling name presentation services, include calling number identification or, more commonly, caller ID. Typically, information associated with a calling telecommunications device is maintained by the local exchange carrier (LEC). If a called telecommunications device subscribes to calling number identification, a central office or switching point servicing the called number obtains the requested information from a database controlled by the LEC supporting the calling telecommunications device.

One problem with this system is that LECs charge other network operators for each query to a database controlled by the LEC. Such a charge can make calling name presentation services unprofitable for some wireline or wireless carriers. Thus, what is needed is to provide calling name presentation services to subscribers without continuously incurring charges for database accesses.

SUMMARY OF THE INVENTION

Calling name presentation services are provided by maintaining a local cache of information. Thus, access to a remote database occurs when requested information does not exist in the local cache.

A method for providing calling name information in a telecommunications network is provided. When a called destination is determined to subscribe to calling name presentation, a local cache is queried to determine if the calling number is in the local cache. If the calling number is in the local cache, calling name information corresponding to the calling number is retrieved from the local cache. If the calling number is not in the local cache, a remote database is queried for the calling name information. The calling name information retrieved from the remote database is stored in the local cache. In either case, the name information is sent to the called destination.

In an embodiment of the present invention, name information stored in a local cache that is determined to be stale is deleted from the local cache.

In another embodiment of the present invention, a reference count associated with the calling number is incremented when the calling number is determined to be in the local cache.

In yet another embodiment of the present invention, the time that name information is stored in the local cache is recorded in the local cache.

In still another embodiment of the present invention, at least one name information entry is deleted if the local cache is full.

In a further embodiment of the present invention, one of a plurality of remote databases is determined to have name information associated with the calling number before a remote database is queried for calling name information.

A system for providing name information of a calling telecommunications device to a called telecommunication device subscribing to a calling name presentation service is also provided. The system includes at least one remote database. Each remote database associates each of a plurality of calling numbers with name information. A telecommunications network has a local cache associating calling numbers with name information. The telecommunications network queries the local cache to determine if the calling telecommunications device calling number is in the local cache. If so, calling name information corresponding to the calling number is retrieved from the local cache. If not, a determination is made as to which of the remote databases contains name information associated with the calling telecommunications device. That remote database is queried for the calling name information and the information is stored in the local cache. The name information is sent to the called telecommunications device.

Another system for providing name information includes at least one line information database associating each of a plurality of calling numbers with name information. A local cache contains a plurality of entries. Each entry associates a calling number with name information. A signal transfer point determines which of the line information databases contains name information associated with the calling telecommunications device and obtains the associated name information from the line information database. A switching point queries the local cache to determine if the calling telecommunications device calling number is in the local cache. If so, calling name information is retrieved from the local cache. If not, name information associated with the calling telecommunications device is obtained from the switching transfer point. The name information is then sent to the call telecommunications device.

In embodiments of the present invention, the switching point may be a signal switching point or a mobile switching center.

In other embodiments of the present invention, the local cache may be associated with the switching point, with the switching transfer point, with a service control point or with a home location register.

Yet another system for providing name information of a calling telecommunications device to a wireless called telecommunications includes at least one line information database and a local cache, each containing entries associating a calling number with name information. A signal transfer point determines which line information database contains name information associated with the calling telecommunications device and obtains the associated name information from the determined line information database. A mobile switching center services the wireless called telecommunications device. A home location register queries the local cache to determine if the calling telecommunications device calling number is in the local cache and, if the calling number is in the local cache, retrieves calling name information corresponding to the calling number from the local cache. If the calling number is not in the local cache, the home location register obtains name information associated with the calling telecommunications device from the signal transfer point. In either case, the name information is sent to the mobile switching center.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 4 is a block diagram illustrating a local cache according to an embodiment of the present invention.

DETAILED DESCRIPTION OF THE PREFERRED EMBODIMENT(S)

Figure 1:
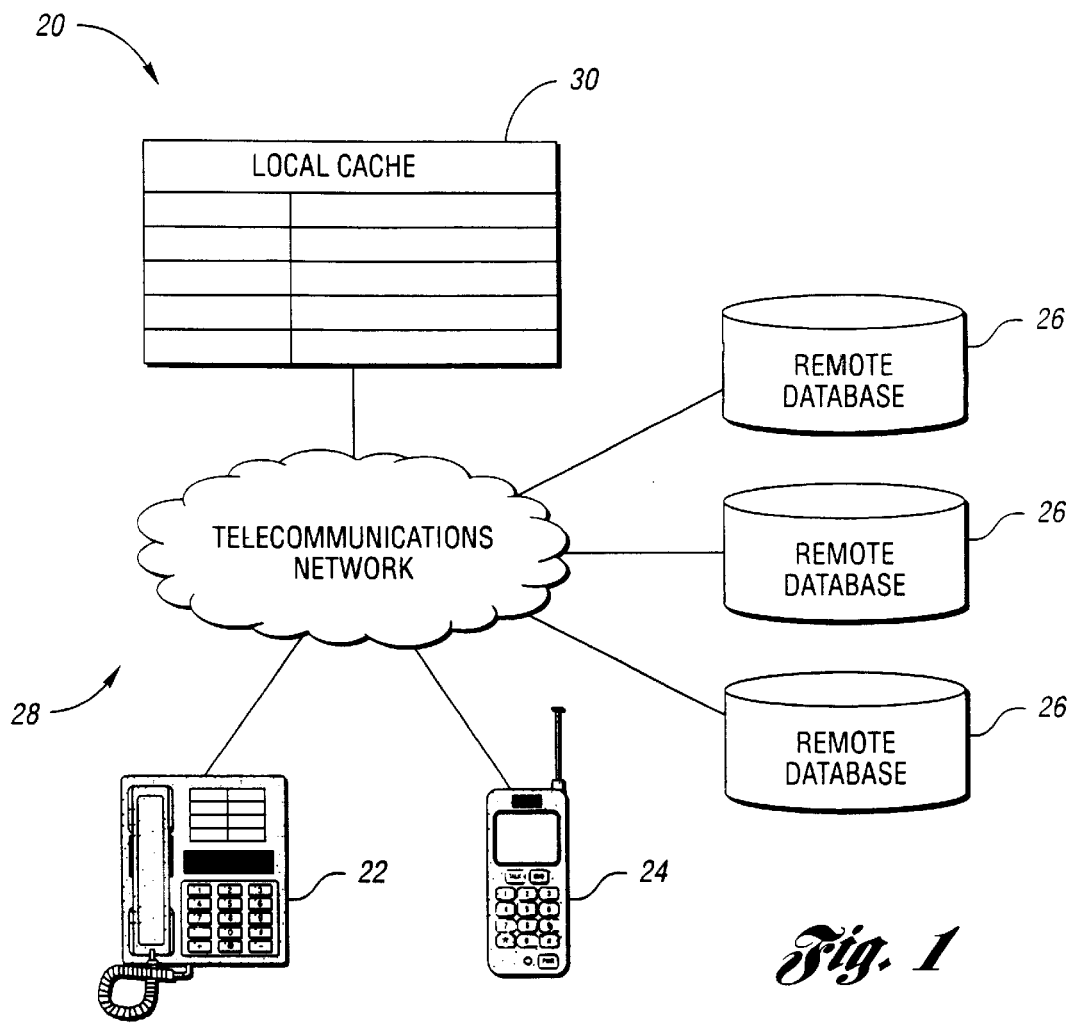
FIG. 1 is a block diagram illustrating a system for providing name information according to an embodiment of the present invention.

Referring to FIG. 1, a block diagram illustrating a system for providing name information according to an embodiment of the present invention is shown. A calling name information system, shown generally by 20, provides information about calling telecommunications device 22 to called telecommunications device 24 when a call placed by calling device 22 is received by called device 24. Calling name information system 20 includes at least one remote database 26. Each remote database 26 associates each of a plurality of calling numbers with name information. Calling name information includes any information which may be associated with calling device 22 such as, for example, the name of a person associated with calling device 22, a company name associated with calling device 22, a location for calling device 22, and the like. Calling name information system 20 also includes a telecommunications network, shown generally by 28. Telecommunications network 28 includes local cache 30 which can associate calling numbers with name information.

When calling information is requested, telecommunications network 28 queries local cache 30 to determine if the calling number for calling device 22 is in local cache 30. If the calling number is in local cache 30, telecommunications network 28 retrieves calling name information corresponding to the calling number from local cache 30. If the calling number is not in local cache 30, telecommunications network 28 determines which remote database 26 contains name information associated with calling device 22. Telecommunications network 28 queries the determined remote database 26 for calling name information and stores the corresponding calling name information received from remote database 26 and local cache 30. Telecommunications network 28 then sends the name information to called device 24.

Figure 2:
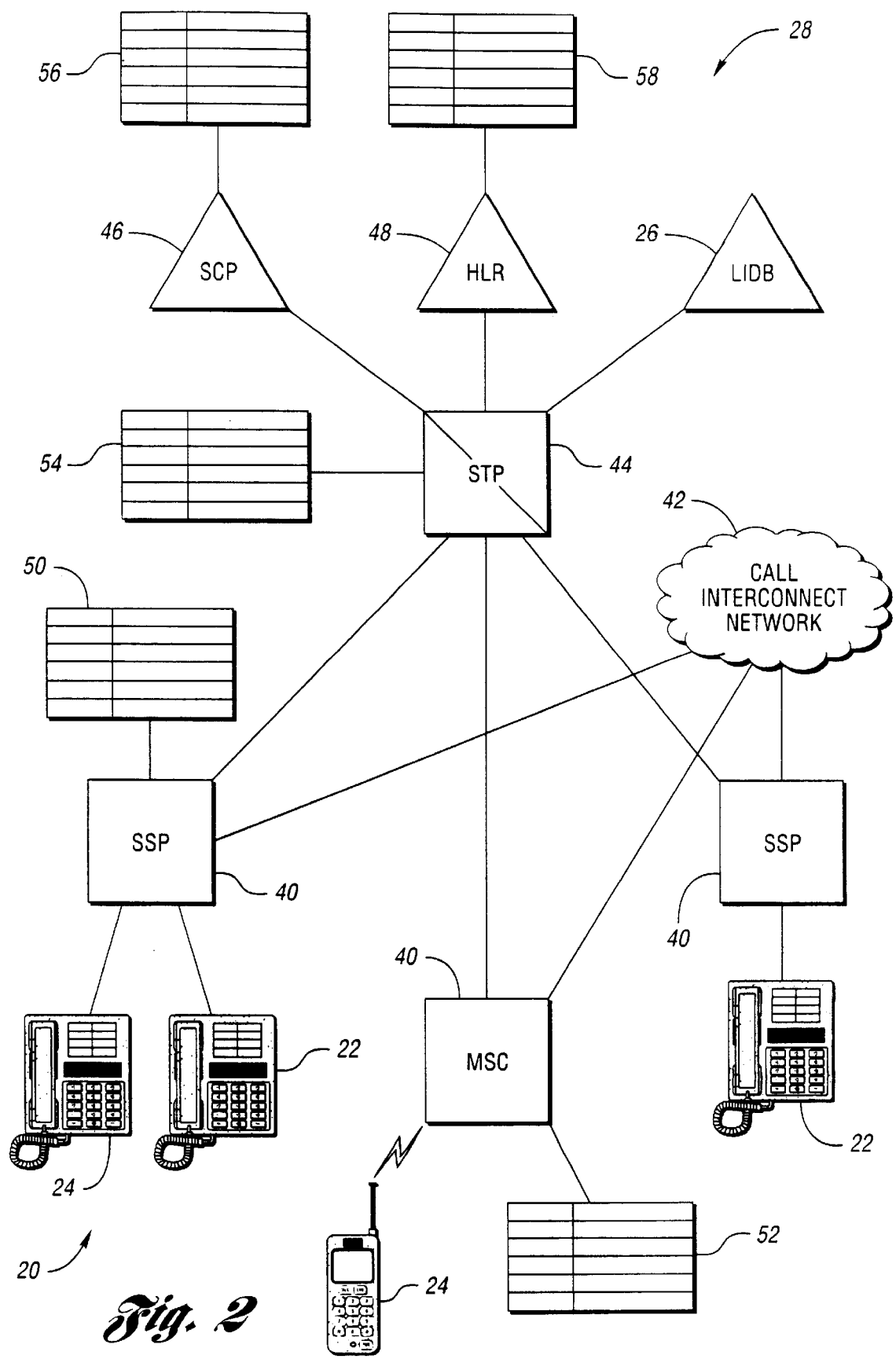
FIG. 2 is a block diagram illustrating an implementation of calling name information caching using a Signaling System 7 architecture according to an embodiment of the present invention.

Referring now to FIG. 2, a block diagram illustrating an implementation of calling name information caching using a Signaling System 7 architecture according to an embodiment of the present invention is shown. Each telecommunications device 22, 24 connects to telecommunications network 28, either directly or indirectly, through one of a plurality of switching points, each designated by 40. Switching point 40 may be a signal switching point (SSP) or a similar device or system for wireline telecommunication devices 22, 24. Switching point 40 may be a mobile switching center (MSC) or a similar device or system for wireless telecommunications devices 22, 24. Switching points 40 are interconnected for call information content routing by call interconnect network 42 which includes a network of trunk lines and high speed switches as is known in the art. Switching points 40 are interconnected for signaling information by a network of signal transfer points (STPs), one of which is indicated by STP 44. At least one STP 44 is in communication with one or more line item databases (LIDBs) implementing one or more remote databases 26.

Telecommunications network 28 may also include one or more service control points (SCPs) 46. Each SSP 46 is a database within the Signaling System 7 network capable of supplying translation and routing data needed to deliver advanced network services. Telecommunications network 28 may also include one or more home location registers (HLRs) 48. Each HLR 48 is a database supporting wireless telecommunications. HLR 48 provides records used to identify and verify a wireless subscriber and to provide data related to wireless features and services.

Prior to the present invention, LIDB 26 was accessed each time information about calling device 22 was provided to called device 24. For example, if calling device 22 is a wireline device, then prior to ringing called device 24, SSP 40 determines that called device 24 subscribes to calling name presentation, suspends calling processing, and launches a GET NAME query to STP 44 to obtain calling name information. STP 44 examines the directory number of calling device 22, determines an appropriate LIDB 26 to provide such information, and relays the GET NAME query to LIDB 26. LIDB 26 retrieves the calling name presentation information, if permissible, and returns it to SSP 40 via STP 44. Finally, SSP 40 converts the information into an appropriate display format and presents the information to called telecommunications device 24. This may be accomplished, for example, by sending frequency shift keyed information between telephone rings.

If called telecommunications device 24 is a wireless device, MSC 40 suspends calling processes prior to ringing called device 24 and launches a location request to STP 44. STP 44 examines the directory number of called device 24, determines an appropriate HLR 48 to process the request, and relays the location request query to HLR 48. HLR 48 determines that called device 24 subscribes to calling name presentation and launches a service request query to STP 44 to obtain calling name information for display at called device 24. STP 44 examines the directory number of called device 24, determines an appropriate SCP 46 to provide such information, and relays the service request query to SCP 46. SCP 46 executes service logic and determines that calling name information is required from LIDB 26. SCP 46 suspends the transaction and launches a GET NAME query to STP 44. STP 44 examines the directory number of calling device 22, determines an appropriate LIDB 26 to provide such information, and relays the GET NAME query to LIDB 26. LIDB 26 retrieves the calling name presentation information, if permissible, and returns the information to SCP 46 via STP 44. SCP 46 returns the information to HLR 48 via STP 44. HLR 48 returns the information to MSC 40 via STP 44. Finally, MSC 40 converts the information into an appropriate display format and presents the information to called telecommunications device 24 during the alerting phase.

As can readily be seen, each call to subscriber 22, 24 of calling name presentation requires a query to remote database 26. Since LEC charges for LIDB 26 queries can be costly, the service provider for subscriber 24 may not be able to recover costs for the service. Consequently, the present invention reduces the number of queries to LIDB 26 and the corresponding cost of the service.

The present invention uses a calling name caching service which may be implemented in one or more network elements. For example, local cache 30 may be implemented as one or more caches 50 associated with SSP 40, caches 52 associated with MSC 40, caches 54 associated with STP 44, caches 56 associated with SCP 46, caches 58 associated with HLR 48, or the like. Similarly, excess of local cache 30 may be performed by switching point 40, HLR 48, or any other suitable component of telecommunications network 28.

Figure 3:
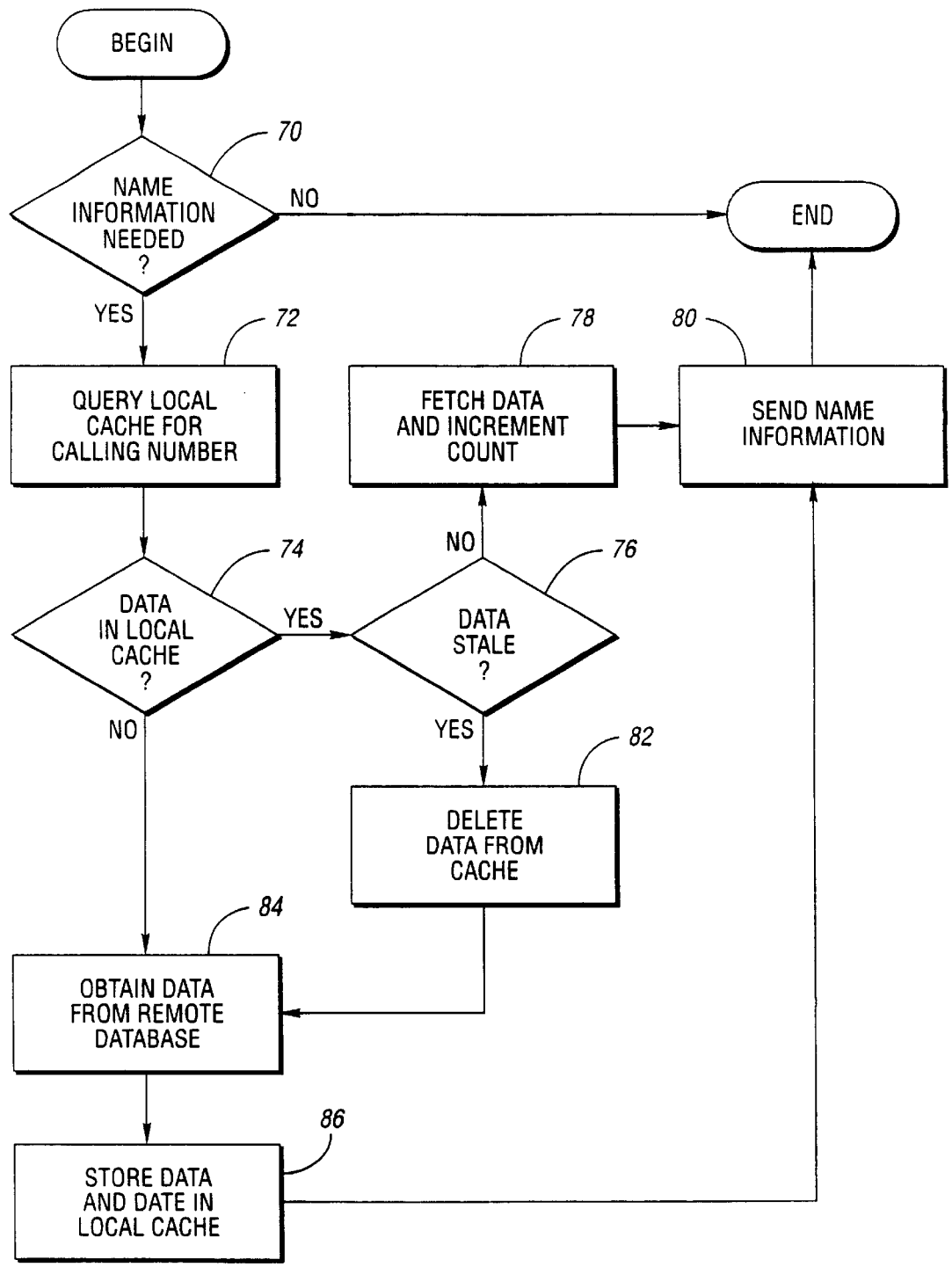
FIG. 3 is a flow diagram illustrating calling name information caching according to an embodiment of the present invention.

Referring now to FIG. 3, a flow diagram illustrating calling name information caching according to an embodiment of the present invention is shown. As will be appreciated by one of ordinary skill in the art, the operations illustrated in the flow diagram are not necessarily sequential operations. The order of steps may be modified within the spirit and scope of the present invention and the order shown here is for logical presentation. Also, the method illustrated in FIG. 3 may be implemented by any combination of hardware, software, firmware, and the like at one location or distributed. The present invention transcends any particular implementation and the embodiment is shown in sequential flow chart form for ease of illustration.

A check is made to determine if name information is needed in block 70. Information is only retrieved if called telecommunications device 24 subscribes to a calling name presentation service. This may, of course, include the possibility of uniform subscription or inclusion of calling name provision in a bundle of services. If no information is needed, the method ends.

If name information is needed, the local cache is queried for an entry containing the calling number in block 72. A check is made in block 74 to determine if requested data is in the local cache. Requested data will be in local cache 30 if the calling number is found in local cache 30. If the data is found in local cache 30, a check is made to see if the data is stale in block 76. Data is considered stale if it has existed in local cache 30 for longer than a particular period of time, typically measured from the date at which the data was entered into local cache 30. This time period may be preset, may depend on the data type, may depend on conditions in network 28, may depend on the open capacity of local cache 30, or may be any other suitable time period. If the data is not stale, the data is fetched from local cache 30 in block 78. Also, a count indicative of the number of times in which the data has been accessed from local cache 30 is incremented. If the name information is not stale, the data is sent to called device 24 in block 80. If the data is determined to be stale, the data is deleted from local cache 30 in block 82.

If either the data is not found in local cache 30 or the data in local cache 30 is stale, the requested data is obtained from remote database 26 in block 84. If the data may exist in more than one remote database 26, a remote database 26 likely to contain the data may be determined, typically based on the calling number. The local data is received from remote database 26 in block 86. Once received, the data is stored in local cache 30 in an entry associated with the calling number. Also, a date and time are stored in local cache 30 indicating the age of the data. The name information data is then sent to called telecommunications device 24 in block 80.

Referring now to FIG. 4, a block diagram illustrating a local cache according to an embodiment of the present invention is shown. Local cache 30 may be implemented as a database having a plurality of entries, one of which is indicated by 90. Each entry has a directory number, indicated by 92, which serves as a key into the database. Each entry 90 may have one or more fields of name information, one of which is indicated by 94. Each entry 90 may have a time of retrieval, indicated by 96, recording the date and time at which the name information was retrieved from remote database 26 and stored in local cache 30. Each entry 90 may have one or more access indicators such as, for example, a reference count indicated by 98. Reference count 98 is incremented each time name information in corresponding entry 90 is accessed from local cache 30. Access indicators may also include the most recent date and time name information is retrieved from local cache 30. Access indicators 98 and time of retrieval 96 may be used to implement a replacement policy for determining one or more entries 90 to remove from local cache 30 when local cache 30 is full.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for providing name information of a calling telecommunications device to a wireless called telecommunications device subscribing to a calling name presentation service, the system comprising:

at least one line information database, each line information database associating each of a plurality of calling numbers with name information;

a local cache containing a plurality of entries, each entry associating a calling number with name information;

a signal transfer point in communication with the at least one line information database, the signal transfer point operative to determine which of the at least one line information database contains name information associated with the calling telecommunications device and to obtain the associated name information from the determined line information database;

a mobile switching center in communication with the called telecommunications device and the calling communications device, the mobile switching center servicing the wireless called telecommunications device; and a home location register in communication with the mobile switching center, the local cache and the signal transfer point, the home location register operative to (a) query the local cache to determine if the calling telecommunications device calling number is in the local cache, (b) if the calling number is in the local cache, retrieve calling name information corresponding to the calling number from the local cache, (c) if the calling number is not in the local cache, obtain name information associated with the calling telecommunications device from the signal transfer point, and (d) send the name information to the mobile switching center, (e) determine that name information stored in the local cache is stale, and delete the stale name information from the local cache.

2. A system for providing name information of a calling telecommunications device to a called telecommunications device subscribing to a calling name presentation service, the system comprising:

at least one line information database, each line information database associating each of a plurality of calling numbers with name information;

a local cache containing a plurality of entries, each entry associating a calling number with name information;

a signal transfer point in communication with the at least one line information database, the signal transfer point operative to determine which of the at least one line information database contains name information associated with the calling telecommunications device and to obtain the associated name information from the determined line information database; and a switching point in communication with the called telecommunications device, the calling communications device, the local cache and the signal transfer point, the switching point operative to (a) query the local cache to determine if the calling telecommunications device calling number is in the local cache, (b) if the calling number is in the local cache, retrieve calling name information corresponding to the calling number from the local cache, (c) if the calling number is not in the local cache, obtain name information associated with the calling telecommunications device from the signal transfer point, and (d) send the name information to the called telecommunications device, (e) implement a replacement policy for determining one or more entries to remove from the local cache when the local cache is full.

3. A system for providing name information as in claim 2 wherein the switching point is a signal switching point.

4. A system for providing name information as in claim 2 wherein the switching point is a mobile switching center.

5. A system for providing name information as in claim 2 wherein the local cache is associated with the switching point.

6. A system for providing name information as in claim 2 wherein the local cache is associated with the signal transfer point.

7. A system for providing name information as in claim 2 further comprising a service control point, wherein the local cache is associated with the service control point.

8. A system for providing name information as in claim 2 further comprising a home location register servicing wireless subscribers, wherein the local cache is associated with the home location register.

9. A method for providing calling name information in a telecommunications network comprising:

determining that a called destination, generated from a telecommunications device having a calling number, subscribes to calling name presentation;

querying a local cache to determine if the calling number is in the local cache;

if the calling number is in the local cache, retrieving calling name information corresponding to the calling number from the local cache;

if the calling number is not in the local cache, querying a remote database for calling name information and storing the calling name information received from the remote database associated with the calling number in the local cache;

sending the name information to the called destination;

determining the local cache is full; and implementing a deletion policy for deleting one or more entries from the local cache when the local cache is full.

10. A method for providing calling name information in a telecommunications network comprising:

determining that a called destination, generated from a telecommunications device having a calling number, subscribes to calling name presentation;

querying a local cache to determine if the calling number is in the local cache;

if the calling number is in the local cache, retrieving calling name information corresponding to the calling number from the local cache;

if the calling number is not in the local cache, querying a remote database for calling name information and storing the calling name information received from the remote database associated with the calling number in the local cache;

sending the name information to the called destination;

determining that name information stored in the local cache is stale; and deleting the stale name information from the local cache.

11. A method for providing calling name information as in claim 10 further comprising incrementing a reference count associated with the calling number when the calling number is determined to be in the local cache.

12. A method for providing calling name information as in claim 10, comprising recording in the local cache a retrieval time that name information is stored in the local cache.

13. A method for providing calling name information as in claim 10 further comprising determining that name information stored in the local cache is stale if the local cache is full.

14. A method for providing calling name information as in claim 10 further comprising determining which of a plurality of remote databases has name information associated with the calling number before querying the determined remote database for calling name information.

15. A system for providing name information of a calling telecommunications device to a called telecommunications device subscribing to a calling name presentation service, the system comprising:

at least one remote database, each remote database associating each of a plurality of calling numbers with name information; and a telecommunications network in communication with the calling telecommunications device, the called telecommunications device, and the at least one remote database, the telecommunications network comprising a local cache operative to associate calling numbers with name information, the telecommunications network operative to (a) query the local cache to determine if the calling telecommunications device calling number is in the local cache, (b) if the calling number is in the local cache, retrieve calling name information corresponding to the calling number from the local cache, (c) if the calling number is not in the local cache, determine which of the at least one remote database contains name information associated with the calling telecommunications device, (d) query the determined remote database for calling name information and store the corresponding calling name information received from the remote database in the local cache, and (e) send the name information to the called telecommunications device, (f) determine that name information stored in the local cache is stale, and delete the stale name information from the local cache.

16. A system for providing name information as in claim 15 wherein the telecommunications network is further operative to increment a reference count associated with the calling number when the calling number is determined to be in the local cache.

17. A system for providing name information as in claim 15 wherein the telecommunications network is further operative to record in the local cache a retrieval time that name information is stored in the local cache.

18. A system for providing name information as in claim 15 wherein the telecommunications network is further operative to record the time name information is retrieved from the local cache in the local cache.

19. A system for providing name information as in claim 15 wherein the telecommunications network is further operative to determine that name information stored in the local cache is stale if the local cache is full.

* * * * *